United States Patent

Sawa et al.

[15] 3,678,247
[45] July 18, 1972

[54] TEMPERATURE CONTROL CIRCUIT WITH ZERO AVERAGE TEMPERATURE OFFSET ERROR

[72] Inventors: Kenneth B. Sawa, Yorba Linda; Thomas M. Bleak, Whittier, both of Calif.

[73] Assignee: Beckman Instruments, Inc.

[22] Filed: April 19, 1971

[21] Appl. No.: 135,043

[52] U.S. Cl. ............................................. 219/501, 219/499
[51] Int. Cl. ............................................................ H05b 1/02
[58] Field of Search .................... 219/494, 497, 501, 499; 315/309; 307/235

[56] References Cited

UNITED STATES PATENTS

| | | | |
|---|---|---|---|
| 3,526,272 | 9/1970 | Watts et al. | 219/497 X |
| 3,474,258 | 10/1969 | Nagy | 219/497 X |
| 3,443,121 | 5/1969 | Weisbrod | 219/497 X |

Primary Examiner—Bernard A. Gilheany
Assistant Examiner—F. E. Bell
Attorney—Ferd L. Mehlhoff and Robert J. Steinmeyer

[57] ABSTRACT

A temperature sensing circuit generates a voltage proportional to the difference between a controlled temperature and a predetermined reference temperature. The voltage is integrated in an integrating amplifier whereby average temperature offset error is reduced to zero. The integrated voltage is compared to a reference potential in a comparator to generate a control signal when the integrated voltage exceeds the reference potential. The control signal operates a switching device through which electrical power is conducted to a heater whereby the controlled temperature is established.

2 Claims, 4 Drawing Figures

INVENTORS
KENNETH B. SAWA
THOMAS M. BLEAK

TEMPERATURE CONTROL CIRCUIT WITH ZERO AVERAGE TEMPERATURE OFFSET ERROR

The present invention relates to temperature control apparatus and more particularly to an electronic temperature control circuit having an integrating amplifier whereby the average temperature offset error is reduced to zero.

In the field of temperature control, it has been the general practice to employ temperature sensing devices in an electrical circuit to sense deviations in temperature from a predetermined reference temperature and convert the deviations into a voltage proportional thereto. The voltage is then amplified and applied to a voltage comparator where a control signal is generated whenever the amplified voltage exceeds a predetermined reference potential. The control signal is utilized to operate a switching device whereby electrical power may be applied or removed from a heating element thereby establishing a controlled temperature. However, when a particular amount of power is applied to the heater in response to the temperature sensing circuit, a corresponding temperature offset or difference between the controlled temperature and a predetermined reference temperature must exist to obtain the desired control signal necessary to apply power to the heater. This temperature offset is an error in the controlled temperature and should be reduced to as small a value as possible. It has been customary to reduce the error by the utilization of high gain amplifiers for amplifying the voltage generated by the temperature sensing circuit. However, problems of feedback loop stability have limited the magnitude of gain to values which are lower than desired. In addition, some temperature control problems require the average temperature be maintained substantially at a precise set point. To accomplish this degree of temperature control the amplifiers in such control circuits would require infinite gain to reduce the temperature offset to zero. Those concerned with the development of temperature control systems have long recognized the need for eliminating the temperature offset error which can result from changes in ambient temperature and variations in power applied to the heating element. The present invention fulfills this need.

The general purpose of this invention is to provide a temperature control circuit which embraces all the advantages of similarly employed temperature control systems and possesses none of the aforedescribed disadvantages. To attain this, the present invention contemplates a unique integrating amplifier arrangement following a temperature sensing circuit whereby temperature offset errors due to changes in ambient temperature and variations in heater power are avoided.

An object of the present invention is the provision of a zero average temperature offset error in a temperature control circuit.

Another object is to provide an integrating function in a temperature control system whereby the need for high gain amplifiers to reduce temperature offset error is eliminated.

A further object of the invention is the provision of a voltage which is proportional to the time integral of the voltage generated by the temperature sensing network of a temperature control circuit whereby small offset voltages produced by a temperature offset are integrated with respect to time to produce substantially large control voltages whereby zero average temperature offset is obtained.

Other objects and many of the attendant advantages of this invention will be readily appreciated as the same becomes better understood by reference to the following detailed description when considered in connection with the accompanying drawings in which like reference numerals designate like parts throughout the Figures thereof wherein.

Figure 1:
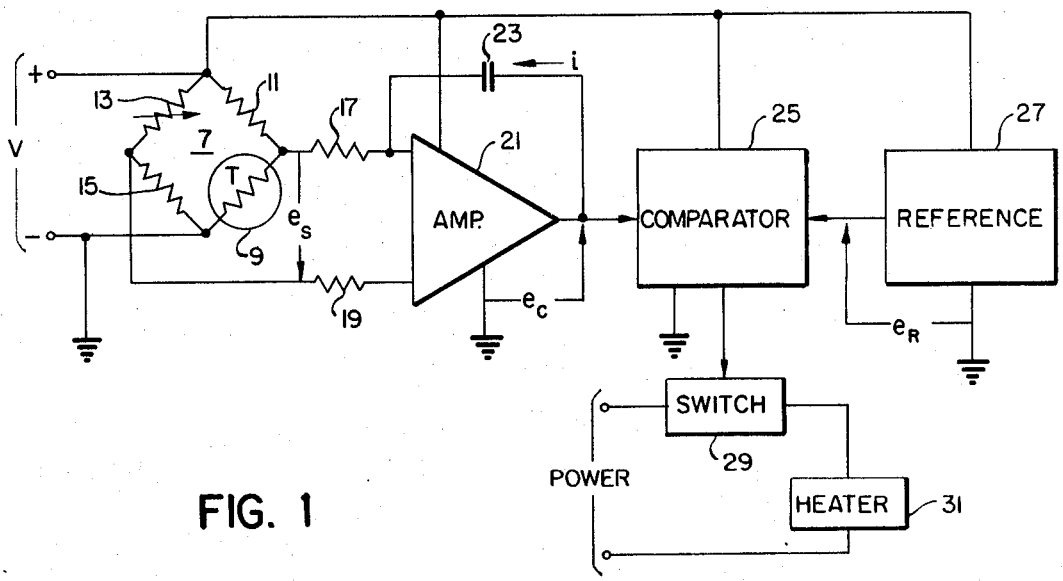
FIG. 1 illustrates a block diagram of a temperature control circuit constructed in accordance with the teachings of the present invention.

Referring now to the drawings, there is illustrated in FIG. 1 a temperature sensing bridge circuit 7 having bridge arms 9, 11, 13 and 15. The junction between arms 11 and 13 and the junction between arms 15 and 9 are connected to a source of d.c. voltage V. Arm 9 is a temperature sensitive circuit element such as a thermistor or similar device. The other arms are substantially independent of temperature and may be composed of fixed or adjustable resistors. Arm 13 is illustrated as an adjustable resistor whereby the temperature set point is adjusted for the temperature control circuit. The junction of arms 13 and 15 and the junction of arms 9 and 11 are connected, respectively, through resistors 19 and 17 to a pair of input terminals to amplifier 21. Capacitor 23 is connected between the output of amplifier 21 and the input of the amplifier attached to resistor 17. The output of amplifier 21 is further connected to one input of comparator 25, another input to the comparator being connected to reference potential 27. The output of comparator 25 is connected to switch 29 through which power is supplied to heater 31.

Figure 2A:
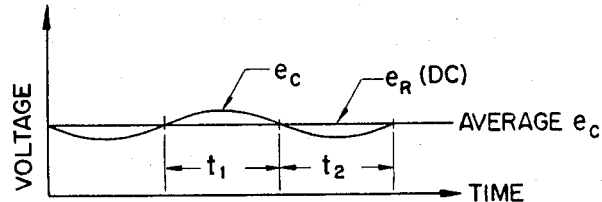
FIG. 2a and FIG. 2b illustrate voltage waveforms at particular points in the circuit of FIG. 1.

FIG. 2a illustrates the voltage waveform $e_c$ which appears at the output of amplifier 21 when reference 27 is a d.c. reference voltage source $e_R$.

Figure 2B:
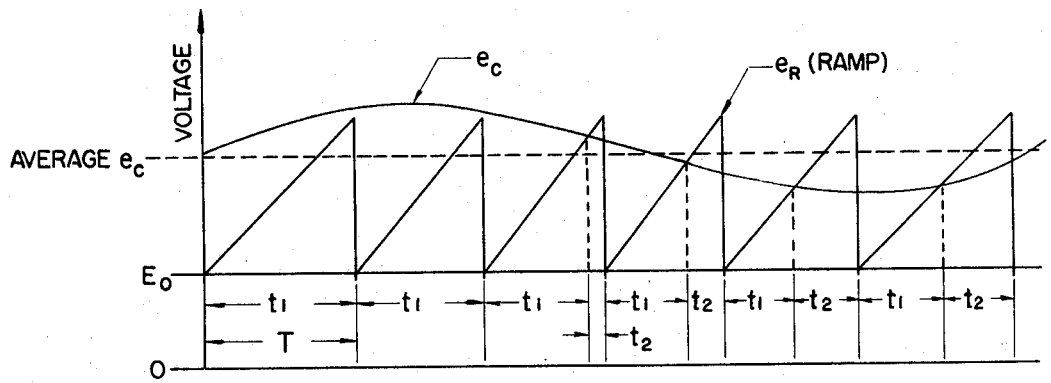

FIG. 2b shows the waveform of the voltage output $e_c$ of amplifier 21 under the conditions where reference 27 is a ramp voltage generator having the waveform $e_R$.

Figure 3:
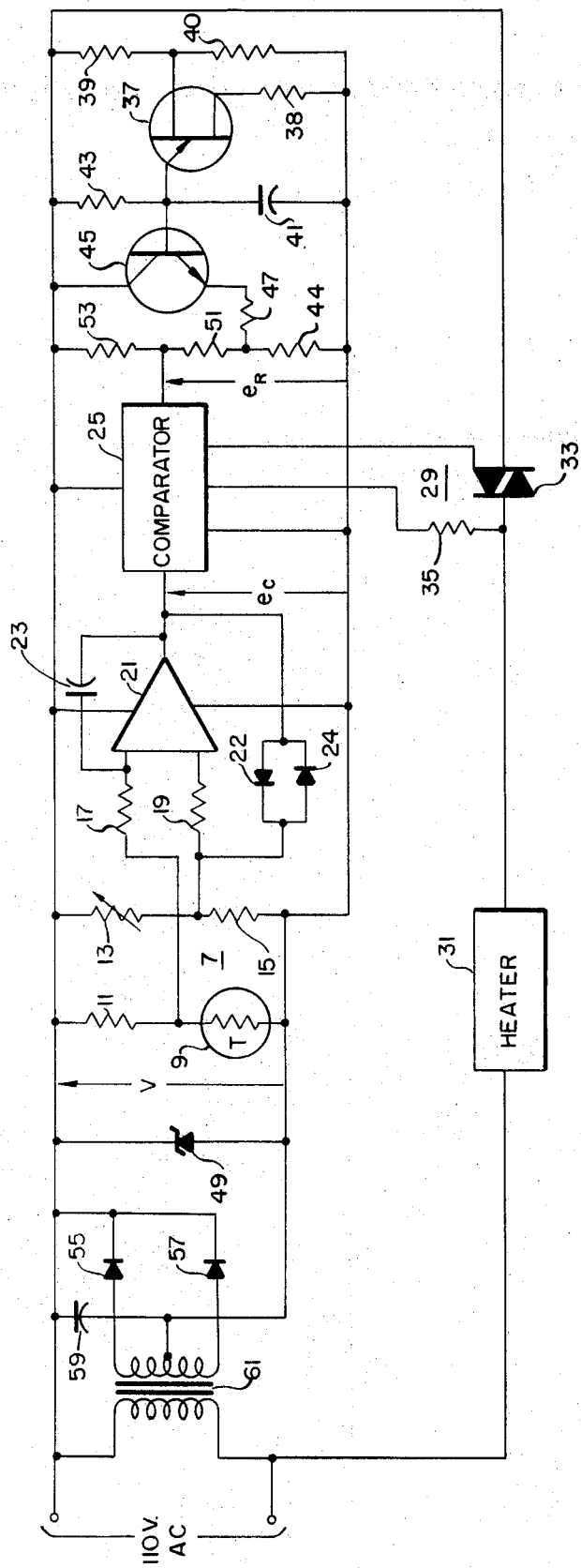
FIG. 3 is a circuit diagram of a preferred embodiment of the present invention.

In FIG. 3 there is illustrated a detailed circuit diagram for operation from 110 volt a.c. power. The temperature sensing circuit 7 is connected through resistors 17 and 19 to amplifier 21 as shown in FIG. 1. In addition to capacitor 23 connected from the output to the input of amplifier 21 as illustrated in FIG. 1, limiting diodes 22 and 24 are connected in parallel and poled in opposite directions between the output of amplifier 21 and the junction of bridge arms 15 and 13. The output of amplifier 21 is connected to one input of comparator 25, the other input to comparator 25 being connected to reference 27 which is illustrated as a unijunction transistor ramp generator. Switch 29 is a triac semiconductor switch 33 having the gate thereof connected to the comparator output. Resistor 35 is connected between the comparator and the reference electrode of the triac switch to prevent the comparator output from turning "on" the triac switch 33 unless the 100 V a.c. line voltage is substantially zero, thereby reducing radio frequency interference generated by the switching of high currents. The ramp generator 27 comprises unijunction transistor 37 having one base electrode thereof connected to the junction of resistors 39 and 40 which in turn are connected in series between voltage source V. The other base of unijunction transistor 37 is connected through resistor 38 to the other end of resistor 40. The emitter of unijunction transistor 37 is connected to the junction of series connected resistor 43 and capacitor 41 which in turn are connected between the source of voltage V, resistor 43 being connected to resistor 39 and capacitor 41 being connected to resistors 38 and 40. The junction of capacitor 41 or resistor 43 is in turn connected to the base of transistor 45 having the collector thereof connected to the other end of resistor 43 and the emitter connected through resistor 47 to the junction of series connected resistors 51 and 44. Resistor 53 is connected to the other end of resistor 51 thereby forming a series connection of resistors 44, 51 and 53 between the voltage source V with the other end of resistor 53 being connected to the collector of transistor 45 and the other end of resistor 49 being connected between the junction of capacitor 41 and resistor 38. The junction of resistors 53 and 51 is connected to one input of comparator 25. The voltage source V is established by the zener breakdown voltage of zener diode 49. Bias for zener diode 49 is obtained from a full wave rectifier circuit formed by diodes 55 and 57 having their cathodes connected together and to capacitor 59 and further connected to the cathode of zener diode 49 thereby forming the positive side of voltage source V. The anode of diode 55 is connected to one end of a transformer winding of transformer 61 and the anode of diode 57 is connected to the other end of the transformer winding. The transformer winding is center tapped and connected to the other end of capacitor 59 which in turn is connected to the anode of zener diode 49 thereby forming the negative side of voltage source V. Bias voltage for the temperature sensing circuit 7 is obtained from voltage source V by connecting the junction of bridge arms 11 and 13 to the positive side of voltage source V and the junction of arms 9 and 15 to the negative side of voltage source V. Amplifier 21 and comparator 25 derive the necessary bias for their operation from voltage source V.

The operation of the circuit can best be understood by turning to the block diagram set forth in FIG. 1 and by reference to the voltage waveforms of FIGS. 2a and 2b. When the temperature to be controlled, hereinafter called the controlled temperature, is equal to a reference temperature which is set by adjustment of the bridge arm 13, the voltage $e_s$ between the junctions of bridge arms 13–15 and 9–11 is zero and consequently the voltage input to amplifier 21 is zero resulting in a zero $e_c$ output voltage from amplifier 21. However, if the controlled temperature deviates from the reference temperature, as for example increasing above the reference temperature, the resistance of thermistor bridge arm 9 will decrease causing a positive voltage $e_s$ to appear at the junction of arms 13–15 with respect to the junction of arms 9–11. This voltage difference causes a current to flow from the output of amplifier 21 into capacitor 23 and through resistor 17 to the junction of bridge arms 9–11. The current flowing through capacitor 23 is integrated to generate a voltage $$e_c = \frac{1}{C_{23}} \int_0^t i \cdot dt$$

where i is the current which flows through capacitor 23 due to the offset or error voltage $e_s$ generated by the temperature sensing circuit in response to the controlled temperature deviating from a preset reference temperature. As long as $e_s$ is a value other than zero, a current i will continue to flow through capacitor 23 and be integrated resulting in the voltage $e_c$ increasing continuously with respect to time. Therefore if sufficient time is allowed to elapse, even the smallest offset voltage $e_s$ can generate an extremely large amplifier output signal $e_c$. When $e_c$ reaches a predetermined reference voltage, $e_R$, generated by reference 27, comparator 25 causes a control signal to render switch 29 nonconductive to remove power from heater 31. The removal of power from heater 31 causes the controlled temperature to drop thereby raising the resistance of the temperature sensing thermistor arm 9, causing voltage $e_s$ to reduce in magnitude. As long as $e_s$ is other than zero, a current i proportional to $e_s$ continues to be integrated in capacitor 23 further increasing voltage $e_c$ and maintaining switch 29 in a nonconducting position. Therefore power will be removed from heater 31 until such time as $e_s$ becomes negative with respect to the polarity shown in FIG. 1 and current i reverses to discharge capacitor 23 and lower voltage $e_c$ to a point below reference voltage $e_R$ where comparator 25 renders switch 29 conductive and again applies power to heater 31.

It should be clear that on the average the integral of the current flowing through capacitor 23 must be zero. Since the current is proportional to error signal $e_s$, the average of $e_s$ then is zero. Moreover, the average of the difference of the controlled temperature with respect to the predetermined reference temperature must also be zero resulting in a zero average temperature offset error.

If reference 27 is selected to be a constant d.c. reference potential $e_R$, then the voltage waveforms illustrated in FIG. 2a are applicable. The voltage waveform $e_c$ is shown cycling about an average value $\bar{e}_c$ which is approximately equal to the d.c. reference voltage $e_R$ supplied by reference 27. During the interval $t_1$, $e_c$ has risen above reference voltage $e_R$ causing switch 29 to be rendered nonconducting thereby removing power from heater 31 to lower the controlled temperature thereby lowering voltage $e_c$. When $e_c$ again becomes less than the reference voltage $e_R$, the waveform enters time interval $t_2$ wherein switch 29 is rendered conductive to apply power to heater 31. It should be clear, that after a steady state condition has been reached, the average value of the current i integrated by capacitor 23 must be zero in order to maintain $e_c$ at a value such that the "on" to "off" ratio of $t_2$ to $t_1$ maintains the necessary heating to make the average of the controlled temperature equal to the predetermined temperature reference. Therefore, the average temperature offset error is zero. The cycling time is determined by the time constant of the heating system determined by the thermal mass of the system in conjunction with the thermal leakage resistance to the surrounding ambient temperature. The time constant of the integrating amplifier can be made small compared to the thermal time constant of the heating system.

It is important to recognize that amplifier 21 does not need to be a high gain amplifier. By selecting the magnitudes of capacitor 23 and resistor 17, substantially small currents i can be made to rapidly develop a significant voltage $e_c$ in response to the integrating action of capacitor 23. Another feature is that any average value of $e_c$ can be maintained at amplifier output 21 without requiring an error offset voltage $e_s$ and a corresponding average temperature offset error. Once a steady state condition is reached, the integral of the varying current i through capacitor 23 must be equal to zero and as is the average value of the error voltage $e_s$ and the corresponding temperature offset error.

Turning to FIG. 2b, there is illustrated the voltage waveform condition when reference 27 is a ramp voltage generator instead of the d.c. reference illustrated in FIG. 2a. Again if the voltage waveform $e_c$ is greater than the voltage ramp reference voltage $e_R$, the comparator 25 renders switch 29 nonconductive to remove power from heater 31 thereby allowing the controlled temperature to drop to lower voltage $e_c$. As the ramp voltage $e_R$ rises and intersects $e_c$, a period $t_2$ begins wherein the comparator 25 causes switch 29 to be conductive to apply power to heater 31. Time period $t_2$ ends abruptly when the cycle of the reference ramp generator ends and the ramp period T is started again. Depending upon the point where $e_c$ intersects the ramp voltage $e_R$, the ratio of $t_2$ to $t_1$ varies to apply more or less heat to maintain the controlled temperature equivalent to the predetermined reference temperature. The average of the "on" to "off" time ratios are directly related to the average value of the voltage $e_c$. Consequently, when steady state conditions have been reached and a steady average value for $e_c$ is established, then the average value of the error signal voltage $e_s$ must be zero such that the integral of the current i through capacitor 23 during the steady state conditions is zero and the corresponding average temperature offset error is also zero. The average value of the ramp generated waveform and the value of voltage $E_0$ shown in FIG. 2b to which the ramp waveform is referenced, do not affect the temperature set point of the temperature control system. The integrated voltage $e_c$ quickly adjusts to any d.c. reference condition, within the limits of saturation or cut-off, that the comparator may require in order to establish the appropriate "on-off" cycle of the heater to maintain the average controlled temperature substantially equal to the preset reference temperature.

Turning now to FIG. 3, reference 27 is shown as a unijunction transistor oscillator or ramp generator. As capacitor 41 charges through resistor 43 toward V volts, a point is reached where unijunction transistor 37 fires discharging capacitor 41 through resistor 38, resistor 38 limiting the current through unijunction transistor 37 so as to prevent irreparable damage thereto. Once the capacitor 41 is discharged, unijunction transistor 37 becomes nonconductive and the charging of capacitor 41 is repeated resulting in a ramp voltage being generated on a repetitive basis. The ramp voltage across capacitor 41 is applied to the junction of resistors 51 and 44 which are part of the resistance divider network composed of series connected resistors 44, 51 and 53. Therefore, the voltage $e_R$ appearing at the junction of resistors 51 and 53 comprises a d.c. steady state value, illustrated in FIG. 2b as $E_0$, upon which a ramp voltage is superimposed. The magnitude of the ramp voltage is adjusted by the relative magnitudes of resistors 44 and 51 and the d.c. level is determined by the relative values of resistors 53 and the sum of resistors 51 and 44. Transistor 45 is an emitter follower and isolates capacitor 41 such that the charging and discharging of capacitor 41 is unaffected by the circuitry connected to the emitter of transistor 45.

Comparator 25 may be of the type which generates a unipolar control signal which can be applied to the control gate of triac semiconductor switch 33. Therefore as voltage $e_c$ drops below reference ramp voltage $e_R$, triac switch 33 is operated to conduct alternating current therethrough in both directions to apply alternating power to heater 31. At the end of time interval $t_2$, the comparator renders the triac switch 33 nonconducting and therefore removes the alternating power from heater 31.

Diodes 22 and 24 are connected from the output of amplifier 21 to the junction of bridge arms 13–15, provide a limiting action for the output voltage $e_c$ relative to the voltage at the junction of bridge arms 13–15. Since it is unnecessary to have large voltages generated at the output of amplifier 21 relative to the junction of bridge arms 13–15, the fraction of a volt range provided by the diode limiting or clamping circuit is sufficient. Since amplifier 21 is an integrating amplifier, the limiting diodes 22 and 24 prevent the amplifier from "locking up" in response to large integrating voltage $e_c$ and therefore prevent the circuit from losing control of temperature.

Voltage potential V for biasing the temperature control circuit is obtained from the full wave rectifier circuit which biases zener diode 49 to its zener breakdown voltage V. Alternating power to supply the full wave rectifier circuit is provided through transformer 61.

An important feature of the present invention is the ability to adjust system parameters such as the thermal time constant, heater power, integrating time constant and the magnitude and frequency of the ramp reference potential, without affecting the zero average temperature offset error. Therefore, great flexibility in design and performance can be realized while maintaining a zero offset error.

It now should be apparent that the present invention provides a circuit arrangement which may be employed in conjunction with temperature control circuits for obtaining a zero average temperature offset error by using an integrating amplifier to maintain appropriate voltages for proper temperature control while maintaining zero average temperature offset error.

Although particular components have been discussed in connection with a specific embodiment of a temperature control circuit constructed in accordance with the teachings of the present invention, others may be utilized. Furthermore, it will be understood that although an exemplary embodiment of the present invention has been disclosed and discussed, other applications and circuit arrangements are possible and that the embodiments disclosed may be subjected to various changes, modifications and substitutions without necessarily departing from the spirit of the invention.

What is claimed is:

1. A temperature control circuit comprising:
   heater means for providing heat;
   bridge circuit means having at least one temperature sensitive element and one adjustable temperature set point element therein adapted to receive energization from a voltage source for generating a first voltage proportional to the difference between a controlled temperature sensed by said temperature sensitive element and a predetermined reference temperature determined by said adjustable temperature set point element;
   an ordinary gain integrating amplifier connected to said bridge circuit means for generating a second voltage proportional to the integral of said first voltage;
   unijunction transistor oscillator means adapted to be energized by said voltage source for producing a reference potential of rising ramp configuration;
   comparator means connected to said integrating amplifier and to said unijunction transistor oscillator means for comparing said second voltage to said reference potential for generating a control signal when said second voltage exceeds said reference potential; and
   triac semiconductor switch means connected between a source of power and said heater, said switch means being responsive to said control signal for selectively opening a bidirectional conductive path to said heater means for alternating electrical power, whereby heat is applied from said heater means to adjust said controlled temperature.

2. The temperature control circuit of claim 1 further including diode voltage limiting means connected between the input and output of said integrating amplifier for limiting the range of the amplifier output voltage.

* * * * *